Aug. 19, 1941. A. W. WARD 2,253,311
TICKET CONTROL DEVICE
Filed June 6, 1938 6 Sheets-Sheet 1
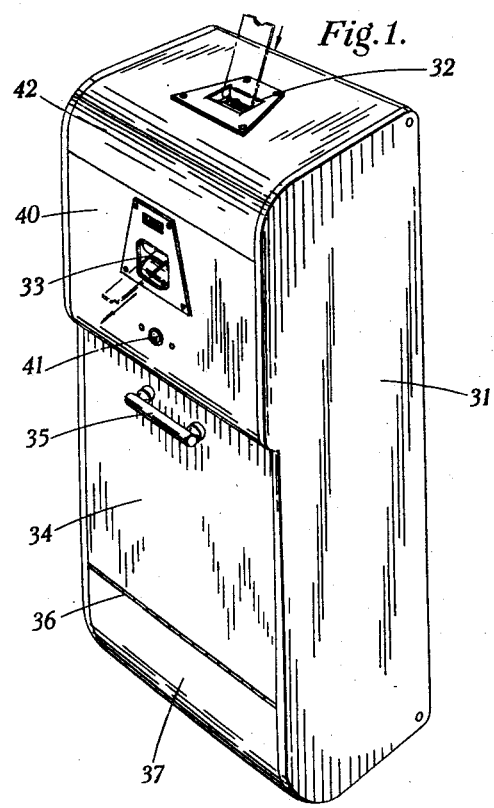
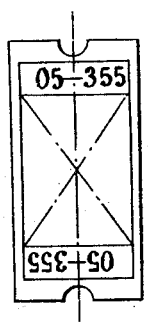
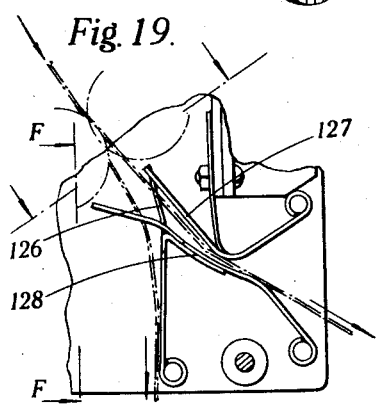
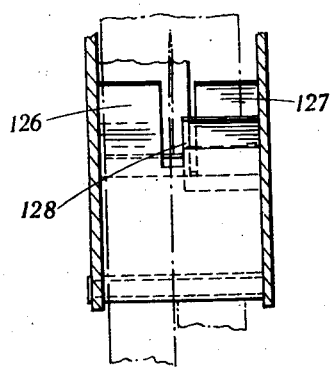
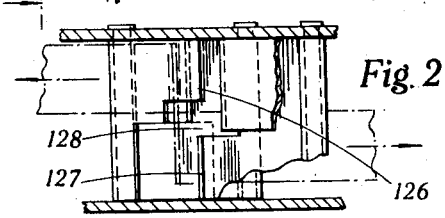
INVENTOR
Albert William Ward
BY
Russer & Harding
ATTORNEY

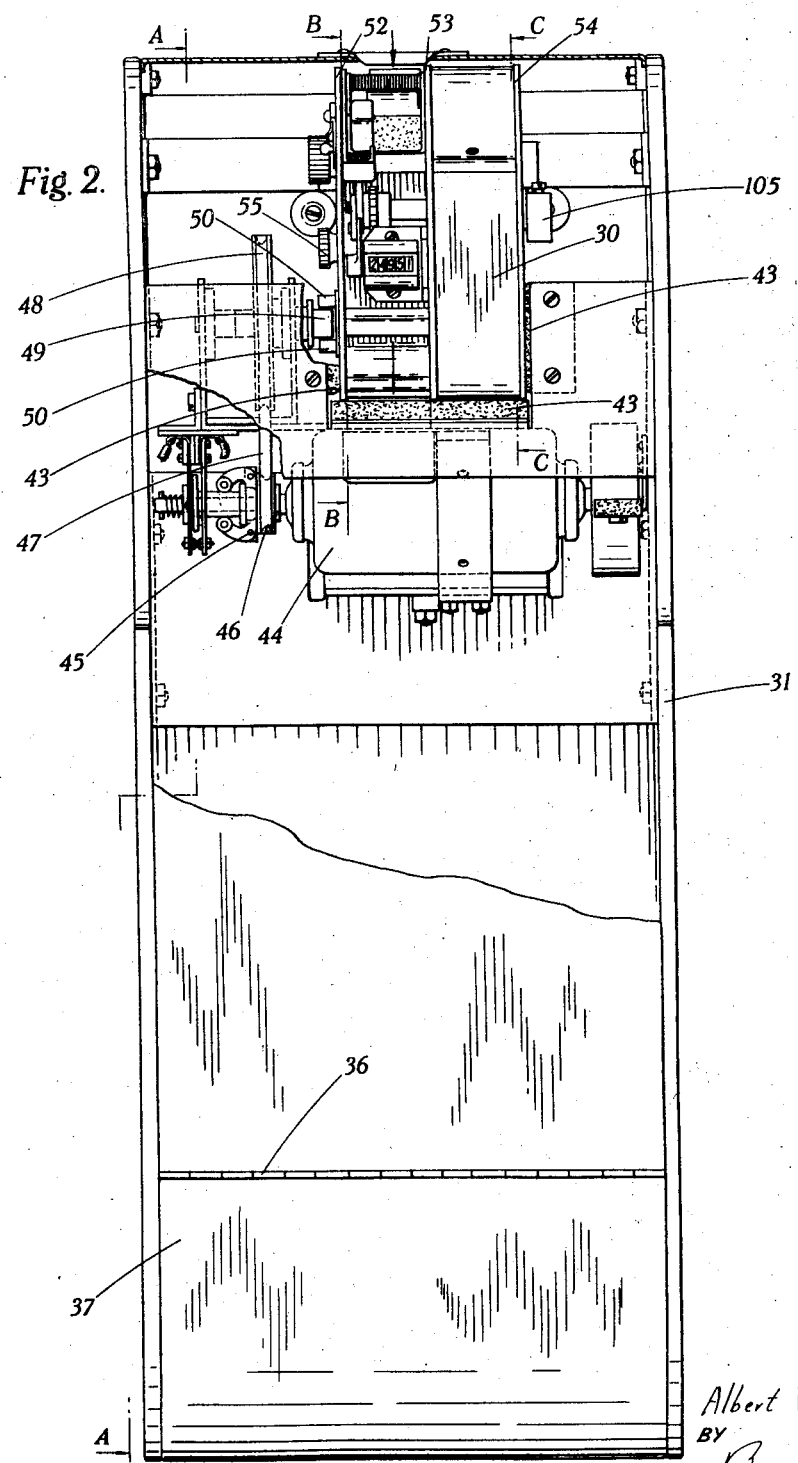

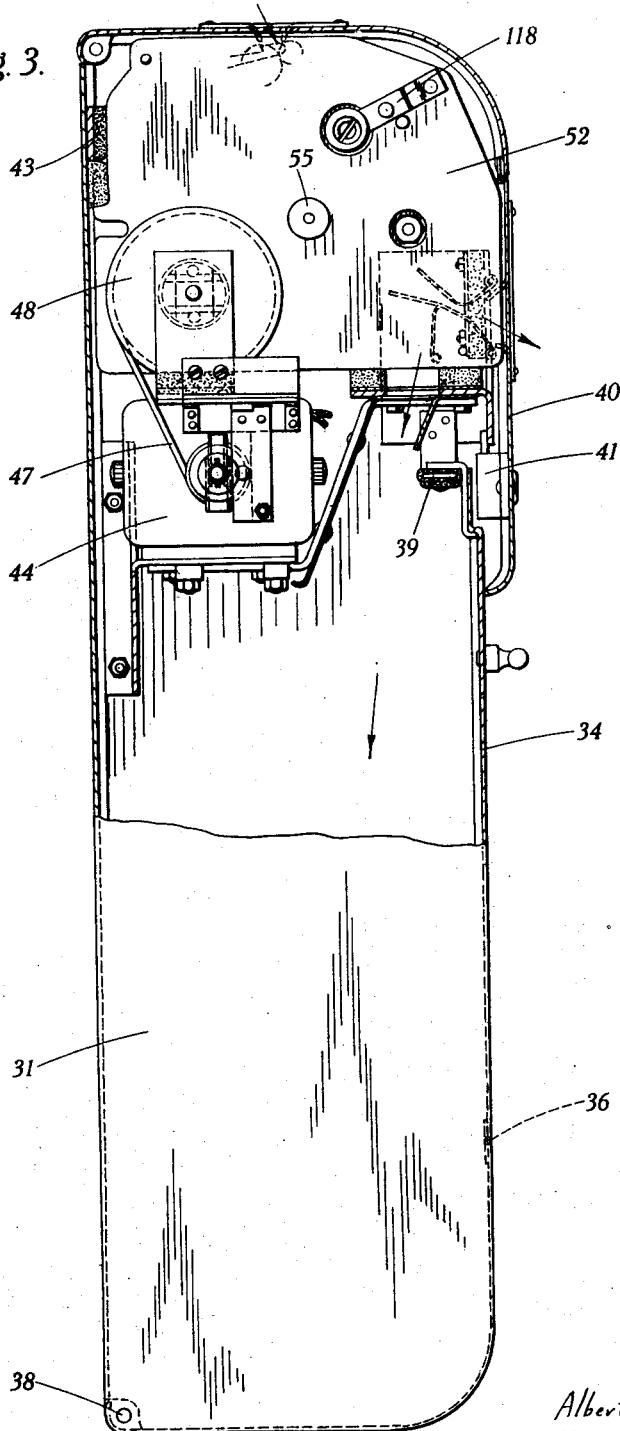

Aug. 19, 1941.  A. W. WARD  2,253,311
TICKET CONTROL DEVICE
Filed June 6, 1938  6 Sheets-Sheet 4

Aug. 19, 1941.  A. W. WARD  2,253,311
TICKET CONTROL DEVICE
Filed June 6, 1938   6 Sheets-Sheet 5
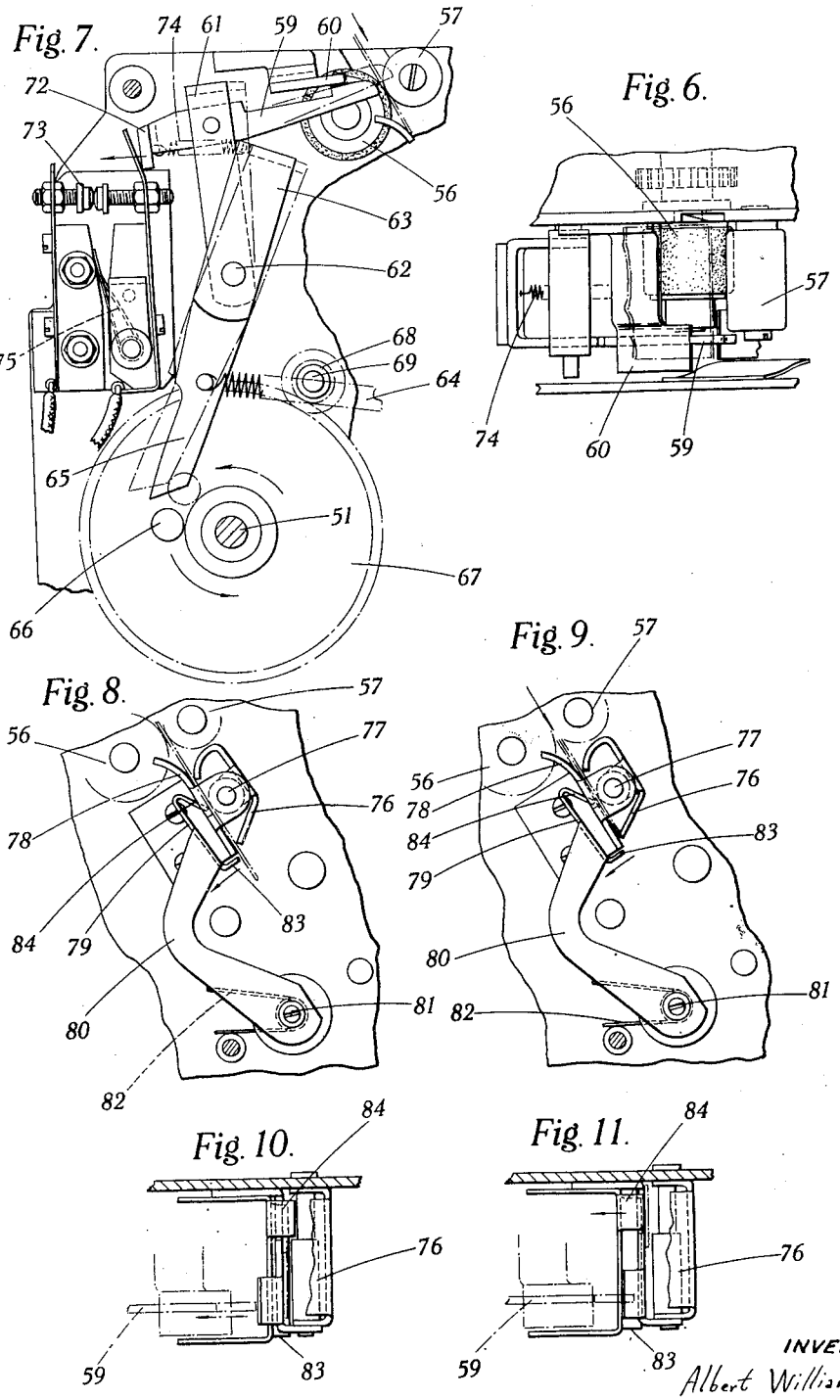

Aug. 19, 1941.  A. W. WARD  2,253,311
TICKET CONTROL DEVICE
Filed June 6, 1938  6 Sheets-Sheet 6
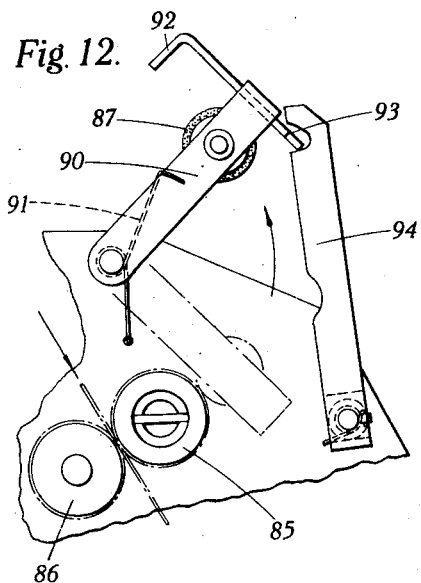
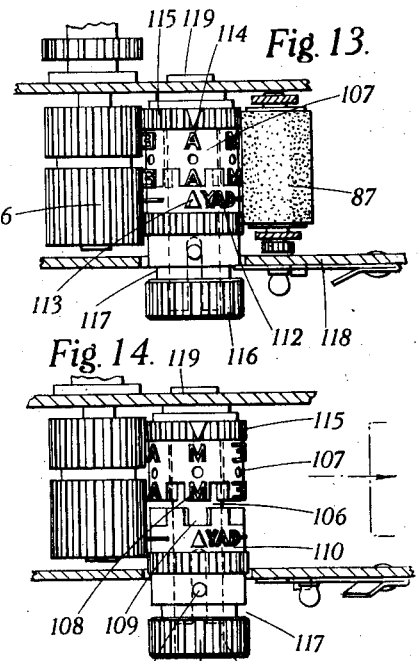
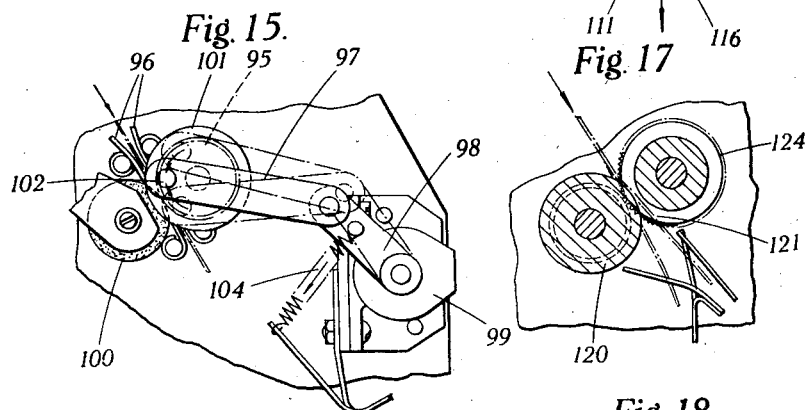
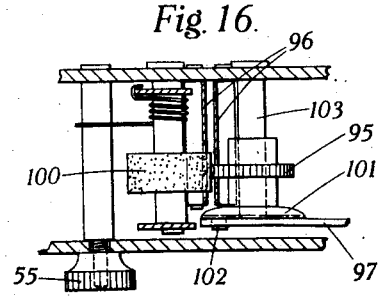
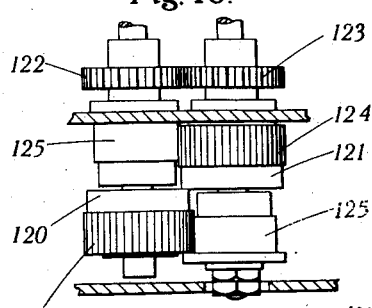
INVENTOR
Albert William Ward
BY
ATTORNEYS Patented Aug. 19, 1941

2,253,311

UNITED STATES PATENT OFFICE 2,253,311

TICKET CONTROL DEVICE

Albert William Ward, Ickenham, England, assignor to Bell Punch Company Limited, London, England, a British company Application June 6, 1938, Serial No. 211,986
In Great Britain June 12, 1937

16 Claims. (Cl. 101—66)

This invention relates to strip ticket cancelling and checking machines for obviating fraud of the kind referred to in Patents No. 1,964,215 and 2,072,532 and co-pending application Serial No. 74,464.

It is the practice in cinema theatres and other places of entertainment in which the admission tickets are issued from a ticket issuing machine or from a roll of tickets for a patron to tender the tickets he has purchased at the pay box to an attendant who tears each ticket in two returning one portion to the patron. As stated in the aforesaid patents and co-pending application, with such a system it is known that theatres suffer a considerable loss through not receiving the full amount of the paid admissions and that such losses are due to collusion between the attendant to whom the tickets are handed and the ticket seller. For example the attendant may so tear the tickets handed to him that he is left with one or more complete tickets, either the correct number of half tickets being returned to the patron, in which case the latter receives two halfs of the same ticket, or an incorrect number being returned. Alternatively the patron may be given the retained portion of a ticket presented by a previous patron. The complete tickets which the attendant thus fraudulently retains are returned to the pay box where they are resold, the money so obtained being pocketed by the cashier.

It is the object of this invention to provide a machine whereby the loss due to the fraudulent practice above referred to can be avoided while still retaining the advantages of the system at present in use.

The present invention comprises the combination of means for feeding a strip of tickets into the machine, means for severing said strip longitudinally into two sub-strips, and means for ejecting one of said sub-strips from the machine.

One embodiment of the invention is illustrated by way of example in the accompanying drawings in which:

Fig. 1 is a perspective view of a ticket control machine constructed in accordance with the present invention.

Fig. 2 is a part sectional front elevation of the machine to a larger scale than Fig. 1.

Fig. 3 is a cross sectional elevation on the line A—A Fig. 2.

Fig. 6 is a detail plan at the line D—D Fig. 4.

Fig. 7 is a detail view showing the trip and resetting mechanism operable on the insertion of a ticket for setting the machine in operation.

Figs. 8 and 9 are detail views showing the means for preventing the passage through the machine of half tickets and two superimposed tickets.

Figs. 10 and 11 are detail plan views showing two different conditions of the means for preventing the advance of a half ticket.

Fig. 12 is a detail side elevation showing the printing means with the inking arrangement therefor.

Figs. 13 and 14 show the printing arrangement in plan.

Figs. 15 and 16 show respectively in side elevation and part plan the arrangement for counting the number of tickets passing through the machine.

Figs. 17 and 18 show respectively in sectional side elevation and plan the severing means for the ticket strip.

Figs. 19, 20 and 21 are detail drawings showing respectively in side elevation, plan, and rear elevation looking in the direction of the arrows F Fig. 19, the arrangement for guiding the sub-strips from the severing mechanism to their individual destinations.

Fig. 22 is a view of the front of a ticket showing the special numbering arrangement adopted for the purposes of this invention and Fig. 23 is a view of the back of the ticket showing the matter imprinted thereon in the machine.

Figure 4:
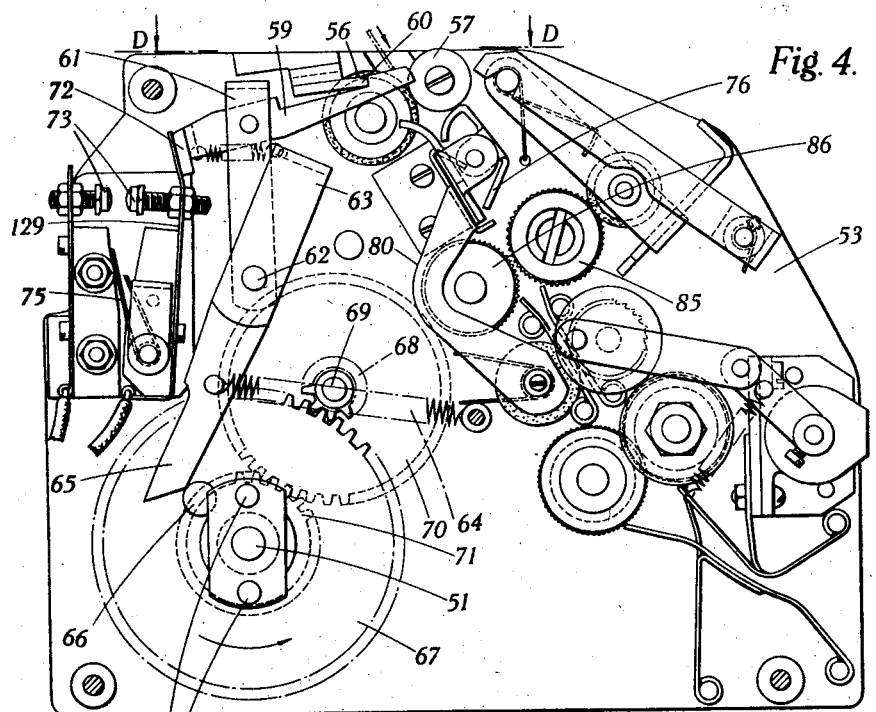
Fig. 4 is a cross section on the line B—B Fig. 2 showing the operating unit, said unit being removably mounted in the casework the exterior of which is shown in Fig. 1.
Figure 5:
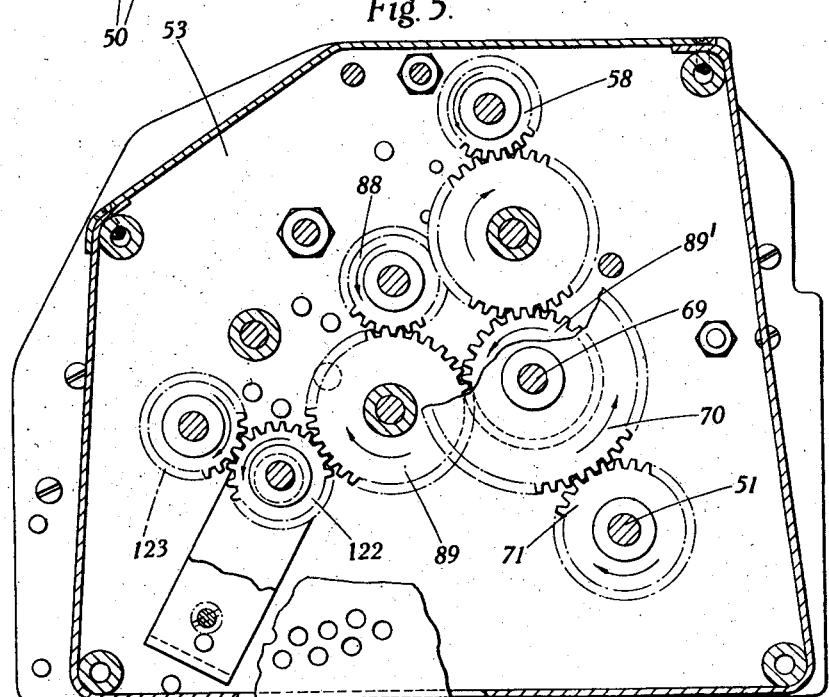
Fig. 5 is a cross section through the unit on the line C—C Fig. 2.

Referring to the drawings the ticket control machine comprises a self-contained unit 30 (Fig. 2) illustrated separately from the machine in Figs. 4 and 5, this unit being removably mounted in any convenient manner in a casework 31 for example of the configuration shown in Fig. 1. This casework may be stood on any suitable support in the cinema or other establishment in which the machine is installed or it may be secured to a wall either flat against the latter or in a recess therein. The casework is provided at its upper side with a mouthpiece 32 into which a ticket strip can be inserted and at its front with an exit opening 33 through which a substrip severed from the original strip is projected as shown. As shown in Figs. 2 and 3 the lower portion of the casework 31 is hollow and is normally occupied by a removable container (not shown) into which the remaining substrip is fed, access to the container being had through a door 34 at the front of the machine provided with a handle 35. In the example shown the door 34 is hinged at 36 to a lower curved portion 37 which is itself hinged at its rear edge 38, the door 34 and part 37 being normally held in position by suspension from a cross piece 39 and by the hinged part 40 which can be locked in place by a lock 41 with its lower edge overlapping the upper end of the door 34. Also the upper curved part 42 of the casing to which the part 40 is pivoted may be hinged at its rear edge, this arrangement enabling withdrawal of the unit 30 from the casework.

The unit 30 is removably supported and held in position within the casework by resilient buffers 43 and is driven by an electric motor 44 removably secured within the casework in any convenient manner. The motor may be provided with any suitable form of centrifugal governor 45. Motion is communicated to the unit 30 from a pulley 46 on the motor shaft, this pulley driving through a belt 47 a further pulley 48 carrying a part 49 arranged for engagement with a pair of pins 50 on the main driven shaft 51 of the unit. The parts 49, 50 thus form a driving connection which is broken or remade when the unit is removed from or repositioned in the casework 31.

The unit 30 which is best illustrated in Figs. 4 and 5 comprises three parallel plates 52, 53, 54 (Fig. 2) between which the various components of the unit are contained, the mechanism for operating on the ticket strip being contained between the plates 52 and 53 and the driving members, such as gear wheels, for such mechanism being located between the plates 53, 54. The plate 52 is made readily removable from the unit for the purpose of enabling alteration of the printing data, adjustment, cleaning or ink replenishing, this plate being held in position by a screw 55.

Referring to Figs. 4 and 5 the unit 30 includes a pair of feed rollers 56, 57 one or both of which may be positively driven. In the example shown the roller 56 is positively driven by a gear wheel 58 and this roller is covered with felt or other like friction material; the roller 57 may if desired be constructed of rubber, ebonite or the like. The rollers 56, 57 are so arranged that when the unit is located in the casework 31 they are situated immediately below the mouthpiece 32 ready to engage and feed through the machine the ticket or ticket strip inserted in said mouthpiece.

Preferably the machine is provided with means operable on the insertion of a ticket to set the machine in operation. In the example shown these means comprise a catch lever 59 (Figs. 4, 6, and 7) having a hook-shaped end adapted to engage behind a cross piece 60 as shown in Figs. 4 and 6 and in interrupted lines in Fig. 7, the said end being arranged in the path of a ticket inserted in the mouthpiece 32. The lever 59 is pivotally carried by an inverted U-shaped member 61 rotatably mounted at its lower ends on a fixed pin 62 and on this pin is also rotatably mounted a second inverted U-shaped member 63 to which is connected a spring 64 tending to rotate the member 63 in a counterclockwise direction as viewed in Figs. 4 and 7. Also the lever 59 is connected to the member 63 by a spring 74 tending to rotate the lever 59 in a counterclockwise direction. One arm 65 of the member 63 is elongated as shown to enable the trip mechanism to be reset at predetermined intervals, such resetting being effected by engagement with the arm 65 of a pin 66 carried on a gear wheel 67 rotatably mounted on the main driven shaft 51. The gear wheel 67 is driven by means of a pinion 68 fixed on a shaft 69 which also carries a gear wheel 70 engaging a gear wheel 71 fast on the shaft 51. Also the catch lever 59 carries an insulating piece 72 on the end opposite that at which the hook is provided, this piece 72 being arranged to engage a blade 129 carrying the movable contact of a pair of contacts 73 included in the circuit to the motor 44 under the conditions now to be described.

With the machine at rest the parts of the trip mechanism occupy the positions shown in Figs. 4 and 6 and in interrupted lines in Fig. 7 with the hooked end of the catch lever 59 engaging behind the cross piece 60 and the contacts 73 open. When a ticket is inserted in the mouthpiece 32 its leading edge engages the end of the lever 59 to rotate the latter against the action of the spring 74 to free the hooked end from the cross piece 60, the spring 64 then acting to rotate the member 63 to cause closure of the contacts 73 by the block 72 to set the motor 44 in operation. The parts now occupy the positions shown in full lines in Fig. 7 with the hooked end of the lever 59 abutting against the underside of the cross piece 60 and the arm 65 in the path of the pin 66 on the gear wheel 67 which has now been set in rotation.

The motor circuit is broken and the trip mechanism reset ready for actuation by a second ticket or ticket strip by engagement of the pin 66 with the arm 65, this serving to rotate the member 63 in a clockwise direction to retract the block 72 from the contacts 73, which are then opened by a spring 75, and also cause the hooked end of the lever 59 to slide along the underside of the cross piece 60 until it reaches the edge thereof whereupon it is snapped into position behind the cross piece 60, as shown in interrupted lines in Fig. 7, by the spring 74 if the ticket strip has by that time passed beyond the rollers 56, 57. The overrun of the motor is arranged to carry the pin 66 past the arm 65 to a position approximately 180° from the point of engagement with the arm, this overrun being ample to ensure the complete feeding through the machine of a ticket which may just have passed the rollers 56, 57 when the member 63 is reset by the pin 66.

If a further ticket strip is inserted just before the pin 66 engages the arm 65 this further strip will prevent the hooked end of the lever 59 snapping back behind the cross piece 60 so that when the arm is released by the pin the member 63 will be allowed to swing again in a counterclockwise direction to reclose the contacts 73 whereupon the further ticket strip will be fed through the machine.

Also I provide means for preventing the feeding through the machine of two superimposed tickets or a folded ticket and also of a half ticket, i. e. a ticket cut longitudinally down its centre similar to the sub-ticket ejected from the machine. These devices are situated immediately after the feed-in rollers 56, 57 and are best illustrated in Figs. 8–11. The device for preventing the passage of a double ticket thickness comprises a member 76 of the configuration shown pivotally mounted on a fixed pin 77, this member co-operating with a fixed guide piece 78 over which the ticket strip is advanced from the rollers 56, 57. The arrangement is such that a single thickness of ticket strip can just pass between the ends of the member 76 and the guide piece 78 as shown in Fig. 8 but when a double thickness is inserted the member 76 is swung by engagement of the double strip with its upper end into a position wherein its lower end forms a stop which obstructs the double strip as shown in Fig. 9, the rollers 56, 57 then slipping over the ticket pulp. The upper end of the member 76 is curved as shown to facilitate entry of the strip between the said member and the guide piece 78.

The half-ticket trap comprises a small plate 79 carried on or formed integrally with a pair of arms 80 pivotally mounted at their lower ends on a fixed pin 81, one of the arms being acted upon by a spring 82 serving to rotate it in a clockwise direction. The lower end of the plate 79 is bent up at 83 as shown across the entire width of the plate and when no ticket strip is present this bent end projects beyond the lower end of the guide piece 78 into the path of the ticket strip. At the upper end of the plate 79 and at the side of the latter furthest removed from the catch lever 59 is a part 84 bent as shown, this part normally lying in the path of the ticket strip in the position illustrated in Fig. 10.

When a ticket strip of the correct width is advanced from the feed rollers 56, 57 its leading edge engages the bent part 84 to swing the plate 79 to a position wherein the end 83 is out of the path of the ticket strip as shown in Figs. 8 and 11, the strip then being allowed unobstructed passage to the further stages of the machine. If however a half-ticket or half-strip is fed through the rollers 56, 57, this strip to actuate the catch lever 59 and set the machine in operation must have been inserted in such a position that it will miss the bent part 84 and be obstructed by the end 83 which is not now deviated from its initial position. If the half ticket strip is inserted in the mouthpiece 32 in a line with the bent part 84 it will not engage the catch lever 59 and therefore will fail to set the machine in operation so that irrespective of the position at which the half ticket strip is inserted in the mouthpiece it cannot pass to the further stages of the machine.

Situated adjacent the exit end of the double and half-ticket traps is a pair of rollers 85, 86 for printing any desired checking data on the ticket strip. In the example shown the roller 85 is provided with appropriate printing surfaces and rotates in contact with an inking roller 87, the roller 86 being knurled and driven by a gear wheel 88 meshing with a gear wheel 89 engaging a gear wheel 89' fast on the shaft 69. The printing and inking rollers are not positively driven and are only rotated on the passage of a ticket strip between the printing roller 85 and the platen roller 86.

The inking roller 87 is carried in a yoke 90 acted upon by a spring 91 serving normally to press the inking roller against the printing roller, the yoke 90 being provided with a finger piece 92 for lifting the inking roller away from the printing roller and with a tail portion 93 which can engage in a recess in the upper end of a pivotal spring actuated support piece 94 as shown in Fig. 12 to hold the yoke in its lifted position and permit recharging of the inking roller and alteration of the session.

The printing roller is arranged to print the day and the session, i. e. morning, afternoon or evening, represented by the letters M, A, E. In the example shown the roller comprises a hollow spindle 106 on which is rotatably mounted a collar 107 bearing the letters M, A, E in pairs as shown in Figs. 13 and 14, this collar being provided with projections 108 arranged to engage in corresponding recesses 109 in a further collar 110 removable from the spindle 106 and connected thereto by a pin 111 in the collar 110 engaging a slot in the end of the spindle. The collar 110 carries printing means 112 for printing the day and also a pair of diametrically opposed arrows 113 which when the collar 110 is positioned on the spindle 106 line up with arrows 114 on a knurled disc 115 secured to the spindle as shown in Fig. 13. The matter printed on the ticket by this unit is illustrated in Fig. 23, the session during which the ticket is cancelled being indicated by that pair of letters which lies opposite the arrows. To change the session the collar 110 is withdrawn as shown in Fig. 14 by means of its knurled end 116 to disengage the recesses 109 from the projections 108 whereupon the collar 107 is rotated to bring the desired pair of letters opposite the arrows 113, 114, the collar 110 being then pressed back to its original position. To change the day printed on the ticket the collar 110 is removed and a collar bearing the appropriate day substituted.

The collar 110 is also provided with an annular groove 117 in which engages a spring blade 118 (Figs. 3, 13 and 14) pivotally mounted on the plate 52, this blade serving to hold the spindle 106 and parts carried thereby against endwise movement on the fixed pin 119.

If desired the collar 107 may be provided with the initial letters of the days of the week so that any one of these letters can be set opposite the arrows 113, 114. In this case the day will be omitted from the collar 110.

Beyond the printing rollers is arranged a toothed or knurled wheel 95 (Fig. 15), the latter projecting into the path of the ticket strip through an aperture in the upper portion of a guide 96 into which the ticket strip passes from the printing rollers. The wheel 95 is connected by a pair of pivotal links 97, 98 to a counter 99 and is arranged in contact with a rubber or felt roller 100 arranged to project through an aperture in the lower portion of the guide 96. The circumference of the wheel 95 is made equal to the length of one ticket so that when a ticket passes between the wheel and the roller 100 the former is rotated one complete revolution to advance the counter 99 by one digit. The wheel 95 thus only rotates when a ticket is passing between it and the rubber or felt roller 100, the number of complete revolutions of the wheel corresponding to the number of tickets passing the same.

The connection between the wheel 95 and the counter 99 is such that any slight over- or under-feeding of the wheel by reason of its circumference not being exactly equal to the length of a ticket is automatically corrected. In the example shown a disc 101 having a pin 102 mounted eccentrically thereon is secured on the spindle 103 on which the wheel 95 is fixed and this pin is connected to the end of the link 97 pivotally connected to the link 98 actuating the counter. The link 98 is associated with a spring 104 serving to locate the pin 102 in the position shown in full lines in Fig. 15 when no ticket is passing the wheel 95 and if over- or under-feeding of the wheel occurs on the passage of a strip of tickets so that the parts occupy either of the dotted line positions shown in Fig. 15, the pin 102 and therefore the wheel 95, are automatically brought back to their initial positions by the spring 104 after the ticket strip has passed the wheel. If desired the pin 102 may be provided on the side of the wheel 95.

If desired I may provide in addition to the counter 99 a remote indicator which may for example be situated in the office of the manager or other responsible official. This remote indicator may be operated electrically from a member 105 (Fig. 2) fast on the spindle 103 carrying the wheel 95, the member 105 being arranged to close a pair of contacts (not shown) once for each rotation of the spindle 103.

From the counting wheel 95 the ticket strip passes to a pair of rotary cutter rollers 120, 121, the latter being arranged with their cutting edges overlapping as shown in Fig. 18 so as to produce a scissors action. The rollers 120, 121 are positively driven in opposite directions by gear wheels 122, 123, from the gear wheel 89 and are arranged to cut the ticket strip longitudinally into two sub-strips preferably along its centre line although the strip could if desired be severed at any other desired position. Also co-axially with the cutter rollers are mounted feed rollers 124, 125 for advancing the ticket strip past the cutter rollers. Also the cutter rollers are preferably subjected to spring pressure serving to hold their cutting edges in contact.

On leaving the cutter rollers one of the sub-strips is directed downwardly by the scissors action and is guided towards the receptacle by the guide piece 126, the other sub-strip being directed between guide pieces 127, 128 (Figs. 19–21) which are so shaped as to exert slight friction on the sub-strip sufficient to prevent it falling out of the machine after it has passed the cutter rollers. The sub-strip will then project from the machine as shown in Fig. 1 and can be removed by the attendant or person inserting the original strip, this sub-strip which is returned to the patron bearing the day and session of cancelling.

To enable the ticket to be identified by its serial number after cancelling, the figures of the number are arranged at each end of the ticket in the manner shown in Fig. 22. With such an arrangement when the ticket is severed along its centre line each sub- or half-ticket will bear some figures of the number at one end and the remaining figures of the number at its other end.

The operation of the machine above described is as follows:

When a ticket strip of the correct dimensions is inserted in the mouthpiece 32 its leading edge engages the catch lever 59 and trips the latter to set the motor in operation. The strip is then picked up by the feed rollers 56, 57 which feed it through the half-ticket and double thickness trap devices to the printing rollers 85, 86 where the day and session of cancelling are printed, the strip being preferably so inserted that the printed matter is applied to the back of the ticket. From the printing rollers the strip is fed between the counting wheel 95 and the roller 100 which serve to record each ticket on the counter 99, and finally the strip passes to the cutter rollers 120, 121 where it is slit longitudinally along its centre line into two sub-strips one of which is directed downwardly into the removable receptacle and the other is fed to the exterior of the machine to enable it to be returned to the patron.

If desired a visual signal may be actuated once for the passage of each ticket through the machine and this signal may conveniently be actuated from the counter.

The invention is not limited to the example described as subordinate details of construction may be varied to meet different requirements.

Having now particularly described and ascertained the nature of my said invention and in what manner the same is to be performed, I declare that what I claim is:

1. In a ticket control machine the combination of means for feeding a strip of tickets into the machine, means for severing each ticket of said strip into a plurality of substantial portions, means for guiding one portion of each of the tickets of the strip after severing to a position exterior of the machine, means effective upon insertion of a ticket strip to set the machine in operation, and means for interrupting the operation of the machine after a predetermined cycle.

2. In a ticket control machine the combination of means for feeding a strip of tickets into the machine, means for severing each ticket of said strip into a plurality of substantial portions, means for guiding one portion of each of the tickets of the strip after severing to a position exterior of the machine, a motor for operating said machine, means for effecting operation of the machine upon insertion of a ticket, means for deenergizing the motor after completion of a predetermined cycle, and means providing feed of a ticket strip completely through the machine by reason of overrun of the motor in the event that the motor circuit is interrupted while a portion of the strip is still in the machine.

3. In a ticket control machine the combination of means for feeding a strip of tickets into the machine, means for severing each ticket of said strip into two substantial portions, means for guiding one portion of each of the tickets of the strip after severing to a position exterior of the machine, and means providing a trap device for preventing the passage through the machine of two superimposed ticket strips or of a ticket strip of a thickness exceeding that of the authorized strip.

4. A machine in accordance with claim 3 in which the trap device comprises a pivotal substantially U-shaped member cooperating with a plate between which and the U-shaped member the ticket strip is fed, the distances between the ends of the U-shaped member and the plate being such that a strip of the correct thickness can pass unobstructed, but if a strip of substantially greater thickness is inserted in the machine the U-shaped member is swung by engagement of the strip with its front end to locate its rear end in a position to obstruct the strip.

5. In a ticket control machine the combination of means for feeding a strip of tickets into the machine, means for severing each ticket of said strip into two substantial portions, means for guiding one portion of each of the tickets of the strip after severing to a position exterior of the machine, and a trap device for preventing passage through the machine of a strip of less than full width.

6. A machine according to claim 5 in which insertion of a ticket strip of correct width actuates a trip device to set the machine in operation and also deflects a stop member to a position wherein the strip is not obstructed but in which a ticket of less than predetermined width on insertion in the machine will fail either to actuate the trip device and set the machine into operation or to deflect the stop member which will then prevent passage of the strip through the machine.

7. In a ticket control machine the combination of means for feeding a strip of tickets into the machine, means for severing each ticket of said strip into two substantial portions, means for guiding one portion of each of the tickets of the strip after severing to a position exterior of the machine, and means for indicating the passage of each ticket through the machine, said means comprising a rotary member adapted to be rotated by the ticket and whose circumference is made substantially equal to the length of a ticket whereby the passage of a ticket past the rotary member causes substantially one complete revolution thereof, and means associated with the rotary member for automatically correcting for slight deviations of complete revolution of the rotary member by reason of non-correspondence of its circumference with the length of a ticket.

8. A machine according to claim 7 in which the correcting means comprises a pin eccentrically mounted on the rotary member and a spring urged link connected with said pin, the spring serving to restore the pin to a predetermined position after passage of the ticket strip if improper advance of the rotor occurred.

9. In a ticket control machine, the combination of a receiving opening for the guidance of a hand-inserted strip of tickets, including an arbitrary number of tickets, into the machine in the direction of the length of the strip, means to which the strip is so guided for engaging the leading edge of the strip and positively advancing said strip as a unit in the direction of its length after insertion of one end of said strip in the machine, means for severing said strip longitudinally into a plurality of sub-strips during such advance as a unit, each of the sub-strips being continuous and containing portions of each of the tickets of the inserted strip, and means for ejecting one of said sub-strips from the machine.

10. In a ticket control machine, the combination of a receiving opening for the guidance of a hand-inserted strip of tickets, including an arbitrary number of tickets, into the machine in the direction of the length of the strip, means to which the strip is so guided for engaging the leading edge of the strip and positively advancing said strip as a unit in the direction of its length after insertion of one end of said strip in the machine, means for severing said strip longitudinally into a plurality of sub-strips during such advance as a unit, each of the sub-strips being continuous and containing portions of each of the tickets of the inserted strip, means within the machine for receiving and retaining one of said sub-strips, and means for ejecting another of said sub-strips from the machine.

11. In a ticket control machine a combination of a receiving opening for the guidance of a hand-inserted strip of tickets, including an arbitrary number of tickets, into the machine in the direction of the length of the strip, means to which the strip is so guided for engaging the leading edge of the strip and positively advancing said strip as a unit in the direction of its length after insertion of one end of said strip in the machine, means for severing said strip longitudinally into a plurality of sub-strips during such advance as a unit, each of the sub-strips being continuous and containing portions of each of the tickets of the inserted strip, means for imprinting on the ticket strip as it passes through the machine a period of cancellation, and means for ejecting one of said sub-strips from the machine.

12. In a ticket control machine a combination of a receiving opening for the guidance of a hand-inserted strip of tickets, including an arbitrary number of tickets, into the machine in the direction of the length of the strip, means to which the strip is so guided for engaging the leading edge of the strip and positively advancing said strip as a unit in the direction of its length after insertion of one end of said strip in the machine, means for severing said strip longitudinally into a plurality of sub-strips during such advance as a unit, each of the sub-strips being continuous and containing portions of each of the tickets of the inserted strip, means for imprinting on the ticket strip as it passes through the machine the period of cancellation, said means comprising a roller having relatively adjustable parts one of which carries means for printing various periods and the other of which carries means for printing an indication serving to indicate on the ticket the pertinent period, and means for ejecting one of said sub-strips from the machine.

13. In a ticket control machine, the combination of a receiving opening for the guidance of a hand-inserted strip of tickets, including an arbitrary number of tickets, into the machine in the direction of the length of the strip, means to which the strip is so guided for engaging the leading edge of the strip and positively advancing said strip as a unit in the direction of its length after insertion of one end of said strip in the machine, means operable by the insertion of a ticket strip into the machine to set the machine in operation, means for severing said strip longitudinally into a plurality of sub-strips during such advance as a unit, each of the sub-strips being continuous and containing portions of each of the tickets of the inserted strip, and means for ejecting one of said sub-strips from the machine.

14. In a ticket control machine, the combination of a receiving opening for the guidance of a hand-inserted strip of tickets, including an arbitrary number of tickets, into the machine in the direction of the length of the strip, means to which the strip is so guided for engaging the leading edge of the strip and positively advancing said strip as a unit in the direction of its length after insertion of one end of said strip in the machine, means operable by the insertion of a ticket strip into the machine to set the machine in operation, means for severing said strip longitudinally into a plurality of sub-strips during such advance as a unit, each of the sub-strips being continuous and containing portions of each of the tickets of the inserted strip, and means for ejecting one of said sub-strips from the machine, the means for setting the machine into operation serving to maintain operation of the machine until all of the tickets of a strip of arbitrary length have been severed.

15. In a ticket control machine, the combination of a receiving opening for the guidance of a hand-inserted strip of tickets, including an arbitrary number of tickets, into the machine in the direction of the length of the strip, means to which the strip is so guided for engaging the leading edge of the strip and positively advancing said strip as a unit in the direction of its length after insertion of one end of said strip in the machine, means for severing said strip longitudinally into a plurality of sub-strips during such advance as a unit, each of the sub-strips being continuous and containing portions of each of the tickets of the inserted strip, and said severing means comprising a pair of cutter rollers having overlapping cutting edges and effective to cause opposite deviations of the severed sub-strips to effect their motion in different paths to eject one of the sub-strips from the machine.

16. In a ticket control machine, the combination of a casing, means providing an opening in the casing for insertion of a ticket, severing means for separating into portions each ticket inserted into the machine, means providing an opening in the casing for the delivery of one portion of each ticket, means for guiding a ticket from the first opening to the severing means, and for guiding therefrom a portion of the ticket to the second opening, and means for counting the tickets moving under control of said guiding means, said counting means comprising a rotary member engaging the tickets, and means for correcting the angular position of said member following the passage of a ticket to insure predetermined movement thereof on account of the passage of each ticket.

ALBERT WILLIAM WARD.